Figure 1:
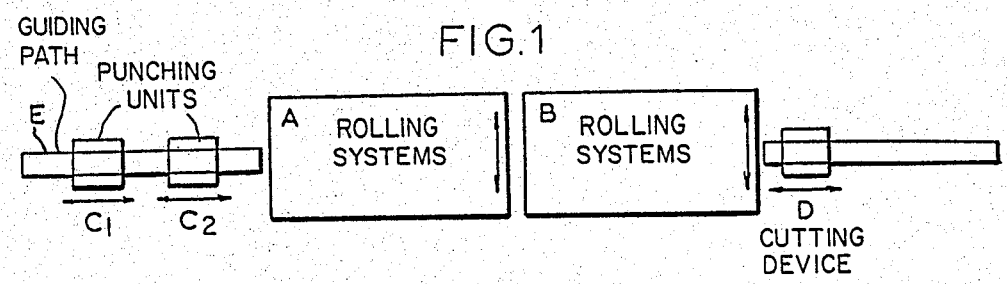

United States Patent [19]

Popken

[11] Patent Number: 4,523,209
[45] Date of Patent: Jun. 11, 1985

[54] APPARATUS FOR THE MANUFACTURE OF PROFILE SEGMENTS

[75] Inventor: Jan H. Popken, Assen, Netherlands

[73] Assignee: Popken Metaal B.V., Assen, Netherlands

[21] Appl. No.: 446,828

[22] Filed: Dec. 3, 1982

[30] Foreign Application Priority Data

Dec. 10, 1981 [NL] Netherlands ................. 8105561

[51] Int. Cl.³ .......................................... G06F 15/46
[52] U.S. Cl. .................................... 364/469; 364/475
[58] Field of Search ............ 364/468, 469, 472, 475, 364/474; 72/132, 203

[56] References Cited

U.S. PATENT DOCUMENTS

| | | | |
|---|---|---|---|
| 3,270,541 | 9/1966 | Tishken | 72/132 |
| 3,591,776 | 7/1971 | Sylvester | 364/475 |
| 4,015,493 | 4/1977 | Woolston | 83/13 |
| 4,102,492 | 7/1978 | Gold et al. | 235/375 |
| 4,191,040 | 3/1980 | Dewey | 72/132 |
| 4,287,742 | 9/1981 | Heiman | 72/49 |

OTHER PUBLICATIONS

*Computer Aided Manufacturing System for Sheet Metal Parts*, Shimozono et al., NEC Res. & Dev., (Japan). 1978.

*Primary Examiner*—Jerry Smith
*Assistant Examiner*—Louis Woo
*Attorney, Agent, or Firm*—Karl W. Flocks; Sheridan Neimark

[57] ABSTRACT

An apparatus for the continuous manufacture of profile segments from metal or plastic strip, comprising first and second profile rolling units for profiling the one and the other lateral side of supplied strip, said first and second rolling units adjustable transversely to the strip passage direction, perforating unit(s), and a cutting means. An electronic control system being provided comprising a pulse generator having its pulse frequency related to the strip passage rate, a pulse counter, a number of counting storages one for each of the perforating and cutting means, said counting storages having fixed counting contents corresponding with the moments of operation of the perforating and cutting means, a processor unit for comparing the count of the pulse counter with the contents of the counting storages and for delivering trigger signals for the activation of the perforating or cutting unit concerned and resetting the counter at the end of a cycle, programming logic for programming the storages and for the adjustment of the profile rolling units, and for setting the production number, supervision logic for supervising the material supply, the machine functions, settings and production count, and a control panel.

5 Claims, 3 Drawing Figures

APPARATUS FOR THE MANUFACTURE OF PROFILE SEGMENTS

The invention relates to an apparatus for continuously manufacturing profile segments, cut to size and possibly perforated, with a one-sided or two-sided profile, such as a U-profile, an H-profile, etc., from metal or plastic strip material, said apparatus comprising a strip supply, a strip guiding path with at least one profile rolling unit, a driving motor for driving transport rolls of the strip guiding path and the rolling unit, and a periodically activatable cutting means.

Nowadays there is an ever increasing demand for profiled strip and profile segments for numerous applications, such as e.g. curtain rails, assembly segments for wall and roof panels and numerous other applications.

Such profile segments are manufactured essentially in series production, the production rate being an important economic factor. That is why it is attempted to use automated machines as much as possible for the manufacture thereof.

A problem however, is that with the usual devices of the prior art, the production rate, which depends on the speed at which the strip to be processed is passed through, remains restricted because of the slowness which is inherent to the use of the mechanical sensors or switches necessary to assure that the profiled strip is cut to the right length. With respect to purely mechanical switches, mechano-electric switches, i.e. electric switches generating at abutment of the outcoming strip an electric signal operating the usually hydraulic activation of the cutting means, constitute an improvement, but also a system equipped in this way works relatively slowly, moreover, there remains the drawback, that the end part to be cut off of the profiled strip has to effectuate the switching by abutting an abutment edge of the switching mechanism, which in itself already implies a limitation of the strip passage rate, as at a too high strip speed the abutting force might cause damage.

If in addition one wishes to make perforations in the strip by means of such a device, which can be done by adding suitable punches to the machine, the operation times of these punches should be adapted with great precision to the total production run, with which the existing systems can be realized only at relatively low strip passage rates and therefore a relatively low production rate.

In practice, furthermore, the problem may occur that it is necessary to switch rapidly from the production of a profile in one cross section size to a profile in another cross section size, for which purpose, especially in the case of two-sided profiles, the profiling roll must be exchanged, so that instantaneous switching to a new production series is not possible.

Thus it is the purpose of the present invention to embody an apparatus overcoming the above-mentioned drawbacks, and capable of continuously manufacturing at a high production rate and in an accurate way, both one-sided and two-sided profile segments, either perforated or not, and of different cross section sizes.

For that purpose the apparatus according to the invention has:

at least one first profile rolling unit for profiling the one lateral side of supplied strip, and at least one second profile rolling unit for profiling the other lateral side of the strip profiled unilaterally by the first profile rolling unit, said first and second profile rolling units being adjustable transversely to the strip passage direction;

at least one periodically activatable perforating unit for making a desired perforation pattern in the strip, each perforation unit being mounted on a carriage which can be mounted in a detachable way before, between or behind the rolling units, and a periodically activatable cutting means, also mounted on a detachable carriage, as well as an electronic control system, including:

a pulse generator of which the pulse frequency is tuned to the passage rate of the strip, a pulse counter, a number of selectable counting storages, one for each perforating unit and one for the cutting unit, each counting storage having a fixed counting content corresponding with the operating moment of the perforating or cutting unit concerned, a processor unit, which compares the count of the pulse counter with the counting contents of the selected counting memories and, if equal values are found, delivers a trigger signal for the activation of the perforating or cutting unit concerned, and resets the counter at the end of a counting cycle, programming logic for setting the counting memories and for the transverse adjustment of the first and second profile rolling units and for setting the production number, supervision logic for supervising the material, the material supply, the machine functions, the settings and the production counting, and a control panel.

In an efficient way the invention uses an electronic control on the basis of pulses for the electronic control of the several perforating units and the cutting unit. As the pulse transmitter has its pulse frequency tuned to the passage speed of the strip, it is possible to accurately determine, by means of a number of pulses counted, the moment at which a certain operation, perforation, or cutting must take place. The processor unit verifies this by means of a number of counting storages which can be programmed in such a way, that the counting contents of each counting storage are determining for the operating moment of the perforating or cutting unit, to which this counting storage has been added. Such a system can switch on the unit concerned with great accuracy at the right moment in such a way, that the perforating or cutting will take place as fast as possible at the right moment. The drives for the several units may be hydraulic with electromagnetic valve control, or electromagnetic.

According to the invention two types of profile rolling units are used for the profiling, namely a first unit, which profiles exclusively the one lateral side of the strip supplied, and a second unit, which profiles the other lateral side of the strip. By the provision that the first profile rolling unit or units and the second profile rolling unit or units are adjustable in the transverse direction, the desired profile width and also, in dependence on the chosen profile width, the profile height can be set as desired, which can be done in a simple manner by means of the programming logic added to the control system. Preferably, the first and second profile rolling units are adjustable transversely to the strip passage direction both horizontally and vertically, so that the possibilities to manufacture profiles of different thicknesses and dimensions are increased considerably. Moreover, it is possible to adjust the rolling units of the one type (first or second type) in such way that they remain out of operation, so that the apparatus according to the invention is suitable for the manufacture of both one-sided and two-sided profiles.

The apparatus according to the invention can function easily at high strip passage rates of the order of 100 meters per minute, which means a high production rate. In connection with this high production rate it is desirable, that the profiling of the left-hand and/or right-hand side of the strip takes place gradually and that is why it is to be preferred that a number of first profile rolling units arranged behind one another and a number of second profile rolling units arranged behind one another are provided, which each can assure a gradual bending of the lateral sides concerned.

Figure 2:
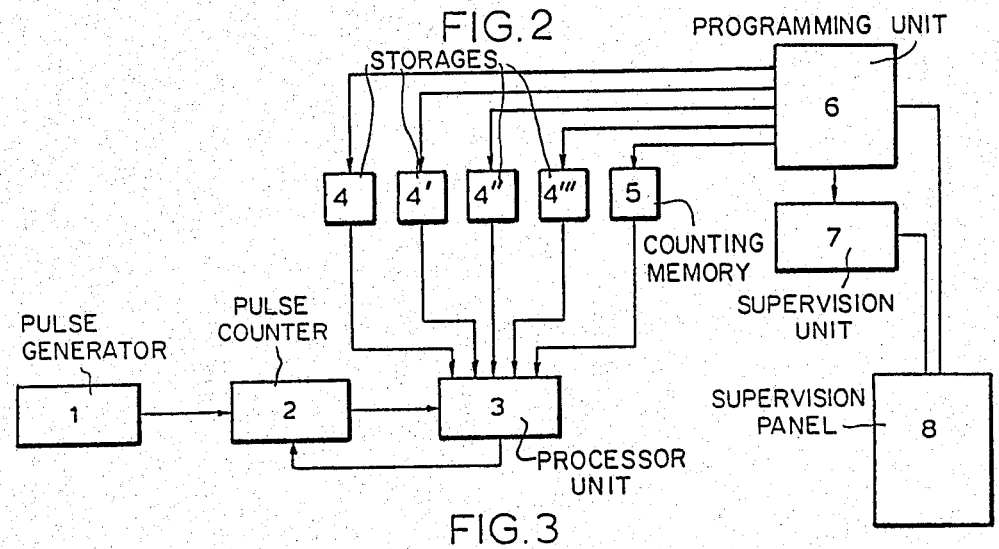
Figure 3:
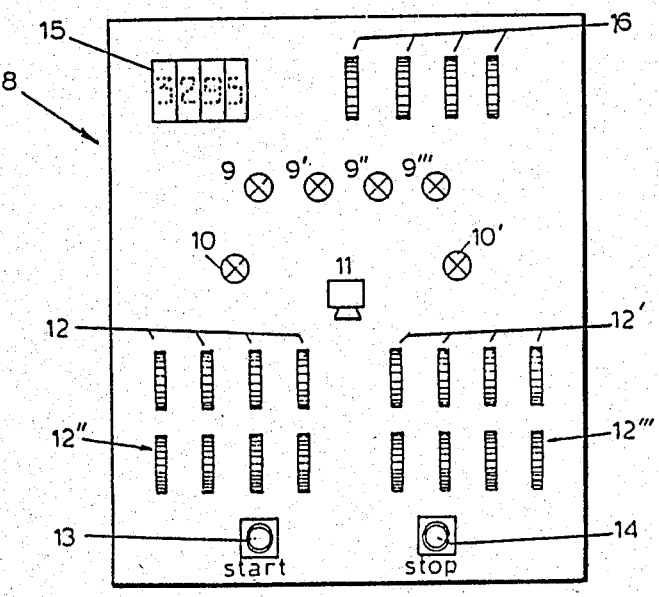

The invention will now be explained with reference to the drawing, in which:

FIG. 1 schematically shows the positioning of the different mechanical components according to the invention;

FIG. 2 shows a block diagram of a basic concept of the electronic control system to be used therewith, and FIG. 3 shows a supervision and control panel to be used with an apparatus according to the invention.

FIG. 1 schematically shows the positioning of the individual mechanical components of an apparatus according to the invention.

According to FIG. 1 the mechanical system comprises a first rolling system A, consisting of a number of profile rolling units (not shown), exclusively provided for the profiling of the left-hand lateral side of a strip, passed through from the left to the right of the figure and guided over the guiding path E.

Adjacent to the first rolling system A there is a second rolling system B, also consisting of a number of profile rolling units (not shown), exclusively provided for the profiling of the right-hand lateral side of the strip passed over the guiding path. The rolling systems A and B are adjustable with respect to one another in the transverse direction (at a right angle to the axis of the guiding path E), both horizontally and vertically.

Before the first rolling system A there are positioned a number of punching units, of which two, C1 and C2, are shown. These are adapted to punch prior to the profiling operation a perforation pattern, which may consist of holes and slots, in the supplied strip. These punching devices are activated periodically by means of an hydraulic drive (not shown), said activation being controlled by periodical control pulses originating from an electronic control. Behind the rolling system B there is a cutting device. also driven hydraulically and controlled by periodical control pulses.

With said device one can obtain in a simple way a profile structure, e.g. a U-shape, as defined by the profile rolling units. For that end unprocessed strip is supplied from the left over the guiding path E and successively passes the punching units C1, C2, which form regularly distributed perforation patterns in the strip. The strip then passes the rolling system A, in which the left-hand lateral side of the strip is bent gradually into a hook profile, whereafter the strip passes the rolling system B, which assures the gradual bending of the other lateral side, so that the strip leaves the rolling system B as a U-profile, which is subsequently cut to size by the cutting unit D, so as to obtain a desired final product, consisting of U-profile segments of a certain length.

The great advantage of the device resides in the fact that because of the adjustability of the two rolling systems A and B with respect to one another in the cross direction, the profile width can be adjusted as desired, as well as the height of the lateral sides, the latter being determined by selection of the strip width in connection with the transverse distance between the profiles of the rolling units A and B. Of course it is also possible to use only the rolling system A or B, and to switch off the other rolling system by displacing it sideways or upwards, so that the device is also suitable for the manufacture of left-hand or right-hand hook profile segments.

The electronic control will now be further explained with reference to FIG. 2. For this control the invention efficiently uses a pulse control system, which is based essentially on the counting of basic pulses, of which the frequency is related to the dimensions of the device and the strip passage rate. These pulses are supplied by a pulse generator 1, of which the pulse frequency is chosen in connection with the strip passage rate. If one starts from a commercially available pulse generator having an output frequency of 10 kHz and if the strip rate is 1 meter per second, this means that one pulse is given per 0.1 mm of strip movement, so that by counting the pulses this movement can be determined to an accepted accuracy of 0.1 mm. If a higher strip rate is desired, e.g. 2 meters per second, the pulse frequency will have to be doubled.

It is also possible to use a pulse generating system directly coupled to the strip speed, e.g. by using a tachometer, which supplies an output voltage to a voltage-controlled pulse-oscillator, so that there exists a direct relationship between strip rate and pulse repetition.

The pulses supplied by the pulse generator 1 are counted in a pulse counter 2, of which the output is connected with a processor unit 3, which compares this count with the respective counting contents of a number of storages 4, 4', 4", 4''' and 5.

Each of storages 4, 4', 4", 4''' is allocated to one of four punching units C of which two, C1, C2, are shown in FIG. 1. The counting content of such a storage is chosen such that it corresponds essentially with the time which the strip needs for arriving at the punching unit concerned. In a similar way, the counting content of the counting memory 5 is added to the cutting device D from FIG. 1. If the comparison of the processor unit 3 ascertains that the count of the pulse counter 2 corresponds with the counting value of one of the counting memories 4, 4', 4", 4''' and 5, it delivers a trigger pulse, which is processed into a control signal for the operation of the relative unit C or D in FIG. 1, so that the punching and cutting units are activated at the right moment to do their work.

At the end of a pulse cycle, i.e. a pulse cycle corresponding with one operating cycle of the device, the pulse counter 2 must be reset. This can be done by designing the pulse counter as a maximum counter, or by means of a reset pulse, supplied by the processor unit at the end of such a cycle. Thereto may be used for example the trigger signal, generated when the count of the pulse counter 2 corresponds with the counting contents of storage 5.

The counting contents of the different counting storages can be programmed by a programming unit 6, consisting of a micro-computer system, which also assures the adjustment of the rolling systems A and B (or of the rolling units comprised therein) with respect to one another, i.e. the adjustment of the desired profile, so that with the device according to the invention both the control and the programming is performed fully automatically. Furthermore, the programming unit allows one to input the desired production number in a supervision unit 7, in which the production number can also be set manually. This production number is verified by a comparison circuit (not shown) by means of a pulse count, e.g. the trigger pulses supplied by the processor unit 3 when the counting memory 5 is compared, said comparison initiating a stop signal for the machine when an equal value is reached.

The supervision unit 7 further supervises the correct functioning of the different components, the strip and the strip supply, and supplies error signals to the control and supervision panel 8 if an error occurs anywhere.

For the invention use can be made to a large extent of existing micro-processor and micro-computer units, which can be accomodated easily in a relatively small housing, of which the door comprises the control and supervision panel 8. Such a control and supervision panel is shown in FIG. 3 and comprises:

a four-decade-display 15, displaying the total of produced profile segments, a group of four thumb-wheel switches 16, with which the total number of profile segments to be produced can be set, four error lamps 9, 9', 9", and 9''' for indicating that an error has occurred in one of the four punching units C1, C2, C3 and C4, two error lamps 10 and 10' for indicating that an error has occurred in the supply of the strip material to be processed, a buzzer 11 for indicating the occurrence of one of the six possible errors mentioned above, four groups of four thumb-wheel switches 12, 12', 12", 12''', respectively, in which a correction distance can be set for the respective four punches, a push-button "start" 13, by means of which the production process can be started, and a push-button "stop" 14, by means of which the production process can be stopped before the set number of profile segments to be produced has been attained.

The four groups of thumb-wheel switches 12, 12', 12" and 12''' serve to provide a correction possibility for the respective punching units. Because of the inherent mechanical inertness each punch will need time to get started and for punching, and the actual punch instruction will have to take place earlier than the actual moment at which the perforating takes place. This correction distance can now be set by means of the above-described thumb-wheel switches, and is set in dependence on the punch used and the speed of movement.

The production process can be started by means of the push-button 13. When this button is depressed, and information programmed by the programming unit is loaded into the punching storages 4, 4', 4" and 4''' and the cutting storage 5, there first being accounted for the adjusted correction distances, whereafter the production process is started. In this case the mutual adjustment of the rolling systems must be set separately, which can also be done by the programming unit. It is also possible to carry out the control in such a way, that when the start button is depressed, first the total machine programming including the adjustment of the rolling units takes place, whereafter an indicator lamp (not shown) lights up, whereafter a second pushing of the start button initiates the production process. Other possibilities, such as the use of more button indications, will be obvious.

As observed above, the machine will stop automatically when the desired and set production number has been reached. The push-button 14 also allows to stop sooner, which may be necessary if the production has to be stopped prematurely because of external causes. This stop pushbutton may serve furthermore for fulfilling the following functions:

In case of an error condition, which means that the process has been stopped by the microprocessor on the ground of an ascertained error, pushing the stop button one will have the consequence that the buzzer is stopped, although the error condition continues to exist, which means that the error lamp concerned keeps burning to indicate what has gone wrong. After the error has been removed and the start button has been pushed, the process continues with the data it was processing (punching information and number already produced) and the burning lamp goes out.

The stop button can be used twice for the so-called system reset, in which everything is cleared, except the possible information in relation to the profile to be produced. If the start button 13 is depressed again after such a system reset, the correction distances will be read in and accounted for once more.

Pushing the stop button 14 once therefore has different effects in dependence on the previous situation: in case of normal production the process will stop and will be resumed with the parameters set after the start button has been depressed, whereas in the case of the error condition, pushing the stop button has the function of switching off the buzzer, since the process has already been stopped on the ground of an occurred error.

Although the invention has been explained in the above by means of one possible embodiment, it will be obvious that numerous other possibilities, modifications, extra provisions, etc., are possible, all within the scope of the invention.

I claim:

1. An apparatus for the continuous manufacture, from metal or plastic strip material, of profile segments, cut to size and possibly perforated, and having a one-sided or two-side profile, comprising a strip supply, a strip guiding path with at least one profile rolling unit, a driving motor for driving transport rolls of the strip guiding path and the rolling unit, and a periodically activatable cutting means, the apparatus comprising:

at least one first profile rolling unit for profiling the one lateral side of the strip supplied, and at least one second profile rolling unit for profiling the other lateral side of the strip profiled unilaterally by the first profile rolling unit, said first and second profile rolling units being adjustable transversely to the strip passage direction, at least one periodically activatable perforating unit for making a desired perforation pattern in the strip, said perforation unit being mounted on a carriage, which can be mounted in a detachable way before, between or behind the rolling units, and a periodically activatable cutting means, also mounted on a detachable carriage, as well as an electronic control system comprising:

a pulse generator, of which the pulse frequency is tuned to the passage rate of the strip, a pulse counter, a plurality of selectable counting storages, one for each perforating unit and one for the cutting means, each counting storage having fixed counting contents, which correspond with the time for initiating operation of the respective perforating unit or cutting means concerned, a process unit, which compares the count of the pulse counter with the counting contents of the selected counting storages and, if equal values are found, issues a trigger signal for the activation of the perforating unit or cutting means concerned, and resets the counter at the end of a counting cycle, programming means for setting the counting storages and for the transverse adjustment of the first and second profile rolling units, and for setting the production number, means comprising supervision logic for supervising the material, the material supply, the machine functions, the settings and the production counting, a control panel and a means for adjusting the timing of said initial operation of said cutting means and perforating unit associated with each of said cutting means and perforating units, said means individually adjusting said timing to account for the inertia of said cutting means and perforating unit, respectively, so that the size of said segments and the spacing between any perforations therein are independent of the inertia of said cutting means and perforating unit.

2. An apparatus according to claim 1, wherein there is a plurality of first profile rolling units, arranged behind one another, for gradually profiling the one lateral side of the strip, and a plurality of second profile rolling units, arranged behind one another, for gradually profiling the other lateral side of the strip.

3. An apparatus according to claim 1, wherein the profile rolling units are adjustable transversely to the strip passage direction, both horizontally and vertically.

4. An apparatus according to claim 1, wherein the supervision logic means comprises a production counter for counting trigger pulses generated at the end of the counting cycles and displaying said signals on display, a production memory which is programmable and stores said production number through the control panel, and a means for comparing the production counter of said supervision logic means with said production number and, if equal values are found, initiating a signal to stop production.

5. An apparatus according to claim 1, wherein that the pulse generator comprises a tachometer on the strip supply line, as well as a voltage-controlled oscillator connected therewith.

* * * * *